VISCOSE DEGASIFICATION APPARATUS

Filed Jan. 15, 1966 2 Sheets-Sheet 1

INVENTORS
EARL H. ELLIOTT
JOHN A. ELLER
BY
B. Johnson

VISCOSE DEGASIFICATION APPARATUS

Filed Jan. 15, 1966 2 Sheets-Sheet 2

INVENTORS
EARL H. ELLIOTT
JOHN A. ELLER
BY

United States Patent Office 3,368,330

Patented Feb. 13, 1968

3,368,330

VISCOSE DEGASIFICATION APPARATUS

Earl H. Elliott, 17 Emory Road, and John A. Eller, 75 New Jersey Ave., both of West Asheville, N.C. 28806

Filed Jan. 15, 1966, Ser. No. 520,778
2 Claims. (Cl. 55—193)

ABSTRACT OF THE DISCLOSURE

An apparatus for degassing a viscous liquid having an assembly for distributing and redistributing the liquid upon entrance to an apparatus comprising in combination: a plurality of separate and distinct flow collecting and flow directing assemblies each composed of several liquid collecting and redistributing sections.

This invention relates to an apparatus for the degasification of viscous liquids and in particular to an improved apparatus for continuous degasification of fiber forming materials such as viscose.

In manufacturing materials from viscose solutions, the solution is extruded and made into useful forms such as fibers and films by passing it through a spinneret assembly having orifices and/or slits of a selected size prior to coagulating and regenerating the cellulose contained therein. Air as well as other gases must be removed before passage through these orifices since their presence leads to the formation of yarn of inferior quality. Air being included in filaments after formation and regeneration leads to obtaining filaments of irregular size caused by air bubbles forming filament weak spots and filament breakage. In an effort to solve the problem of air being included, several expedients have been devised over the years in an effort to provide its effective removal along several points of viscose staging and flow up to and including the spinneret assembly, and a method most commonly used calls for subjecting the viscose to a relatively high vacuum. One method for removal which has met with some degree of success comprises subjecting a batch of viscose being maintained in a vessel, such as a curing tank for the viscose, to a vacuum.

Various type configurations have also been proposed to permit removal from a stream or flow of viscose in a continuous manner and which can be positioned either downstream or upstream of the curing tanks therefor. One continuous method provides a separate and distinct degasification apparatus and frequently uses merely a large tank(s) attached to a vacuum and having a series of baffles, troughs, or plates serving as means to agitate and spread the viscose solution into a layer in flowing contact with a sidewall of the tank.

While serving to remove entrained gases from the viscose in at least some degree, the above mentioned degassing methods and apparatuses have not proven completely satisfactory. They either fail to create and maintain a sufficiently thin and uniform film along the sides of the tank in an effort to permit effective degasification, or they often allow excessive splashing and foam spill-over of the viscose within the tank with no effective means to recycle the splattered foam to a thin film spreading and supporting surface. Excessive splashing causes relatively large globs of splattered viscose and is caused by failure of known apparatus to provide means preventing undesired foaming viscose spilling over the tops of the trough instead of being spread evenly against the tank walls. Splattered globs of viscose cannot be effectively degasified because of their shape and the fact that their residency time against the inner sidewall is limited in comparison to a relatively thin film always evenly flowing either against the inner wall or other surface within the tank which permits such flow. Splattered viscose globs also cling to various inaccessible places within the tank and cause eventual formation of a tenacious film of residue material usually called a viscose "skin" and, in the event that the apparatus is not periodically cleaned, the skin hardens and builds up, eventually flaking off, and thereby acting to impede the flow of viscose within the system.

Excessive "flashing" and resultant skin formation has particularly been a problem in known apparatus having a weir type confining and distribution means for spreading the viscose immediately upon its entrance to the apparatus. Skin formation in this area is particularly undesirable since it not only adversely influences a uniform flow downstream of the apparatus up to and including the spinneret, but it also prevents proper even flow at and through the weir and accordingly proper degasification of the viscose within the apparatus.

In addition to these above problems, known types of apparatus are also very difficult to disassemble and reassemble for periodic cleaning and/or repair and they require comparatively large amounts of labor for this purpose. The "on-stream time" of such devices is seriously affected by being out of service and often cause a complete shutdown of the entire viscose line for extended and unnecessary periods of time while being cleaned or parts are being replaced; thus, as one can appreciate, they are very expensive to operate and maintain.

Accordingly, it is a principal object of this invention to eliminate and/or greatly alleviate the foregoing detrimental features in conventional degasification apparatuses.

A further object is to provide a novel apparatus which can continuously and substantially more completely degas a flowing viscose solution.

Another object of this invention is to provide means to prevent "flashing" and thus inhibit viscose skin formation in a viscose distributing manifold or weir.

Another object is to provide an apparatus having improved means for continuously collecting and spreading viscose as a thin film while effectively controlling undesirable splashing caused by viscose foaming and spill-over.

A still further object is to provide an improved baffle arrangement within a degasification apparatus which permits an increased degree of collecting and redistributing the viscose into a thin film by including an additional flow supporting surface.

Finally, it is an object of this invention to provide an improved baffle arrangement within a viscose degasification vessel which may be conveniently and entirely removed for cleaning and/or repair purposes.

This invention comprises an apparatus, simple in construction, for the continuous degasification of viscose having means for feeding viscose continually through a tank which is subjected to a vacuum. Substantially complete degasification of the flowing viscose solution is permitted by an improved configured baffle assembly and viscose distribution weir assembly. The novel baffle assemblies serve not only to collect and uniformly spread and maintain the viscose along the interior walls of the tank but also serve to collect and spread viscose along a projecting intermediate type flow surface in an effort to increase the effective thin film degasification surface, should the viscose, by excessive foaming, spill over the top of a baffle unit. The weir assembly of the invention comprises improvements which uniformly distributes and spreads the viscose being introduced to the apparatus while also preventing highly undesirable foaming within the assembly.

An additional advantage capable of meeting the vigorous demands caused by the necessity of operating at maximum capacity is permitted by mounting the baffle system within the tank in a manner which permits relatively quick and easy removal thereof for cleaning and repair purposes when compared to various conventional apparatuses.

Figure 1:
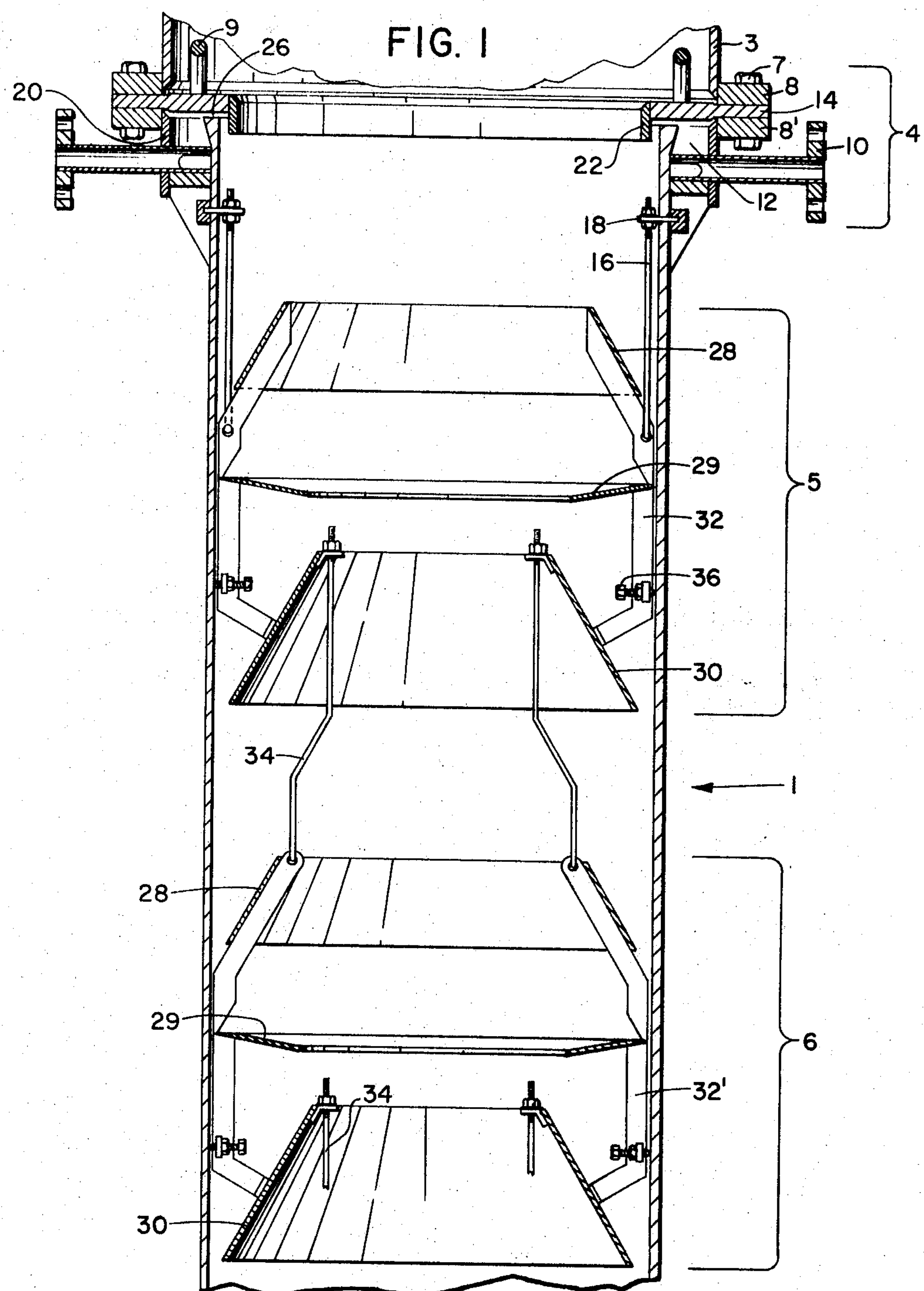
FIGURE 1 illustrates a cross-sectional view of the improved degasification tank assembly according to the invention.

FIGURE 1 shows the degasification apparatus having a cylindrical lower baffle support housing 1, an intermediate weir assembly 4, assemblies of which are all enclosed by tank head 3. Head 3 is detachably mounted to lower cylindrical housing 1 by bolts 7 positioned through the circumferentially extending and laterally projecting cooperating flange members 8 and 8'; these members are integral to head 3 and weir sidewall 20 respectively. Weir assembly 4 is recessed and braced to lower housing 1 at 2. As one skilled in the art can appreciate, the flange and support members may be constructed separately and connected to the assembly by weldment, if desired. Flange members 8 and 8' further support ring-like weir plate 14 which has a downwardly extending lip portion 22 serving as a deflector and the initial film forming means for viscose entering the tank. Weir plate 14 is adjustable in a vertical direction and reasons for this will be set forth below. Attached to the top of weir plate 14 are handles 9. The handles are provided for the convenience of removing the plate in and out of a normal operating position and permits gaining access to the circumferentially extending viscose distribution trough area 12 which is defined by sidewalls 20 and top cylindrical tapered portion 24 of baffle housing 1. This also permits access to the lower portion of the tank and to baffle assemblies 5 and 6. Connecting to assembly 4, there are two or more viscose inlet nozzles 10 which extend through trough 12 and abut the tank sidewall. Each nozzle is further provided with an opening 15 which communicates directly to the distribution trough. Thus, viscose entering through the nozzle passes directly into and fills trough 12. This permits the viscose to be continuously distributed around the inner circumference of the tank when passing through circumferentially extending opening 26 (as best shown in FIGURES 2 and 3).

Figure 2:
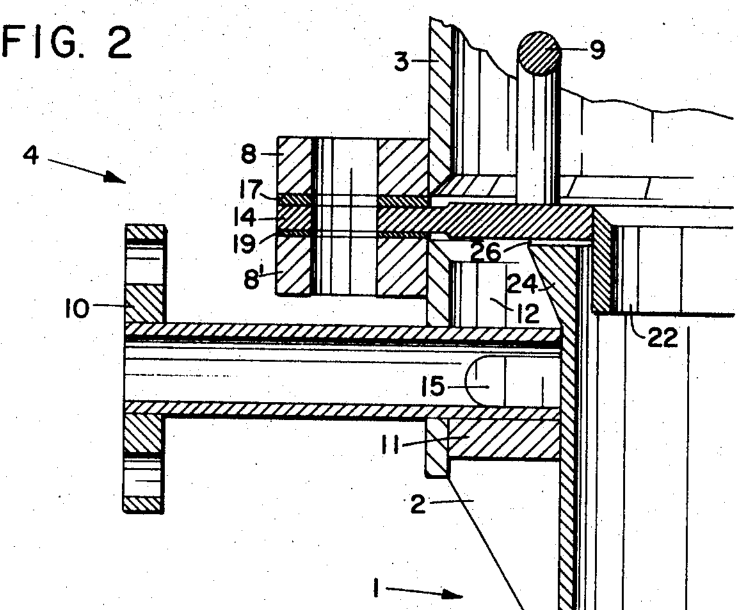
FIGURE 2 is an enlarged sectional view and more clearly illustrates the viscose entry conduit and weir arrangement having the improvements according to this invention.
Figure 3:
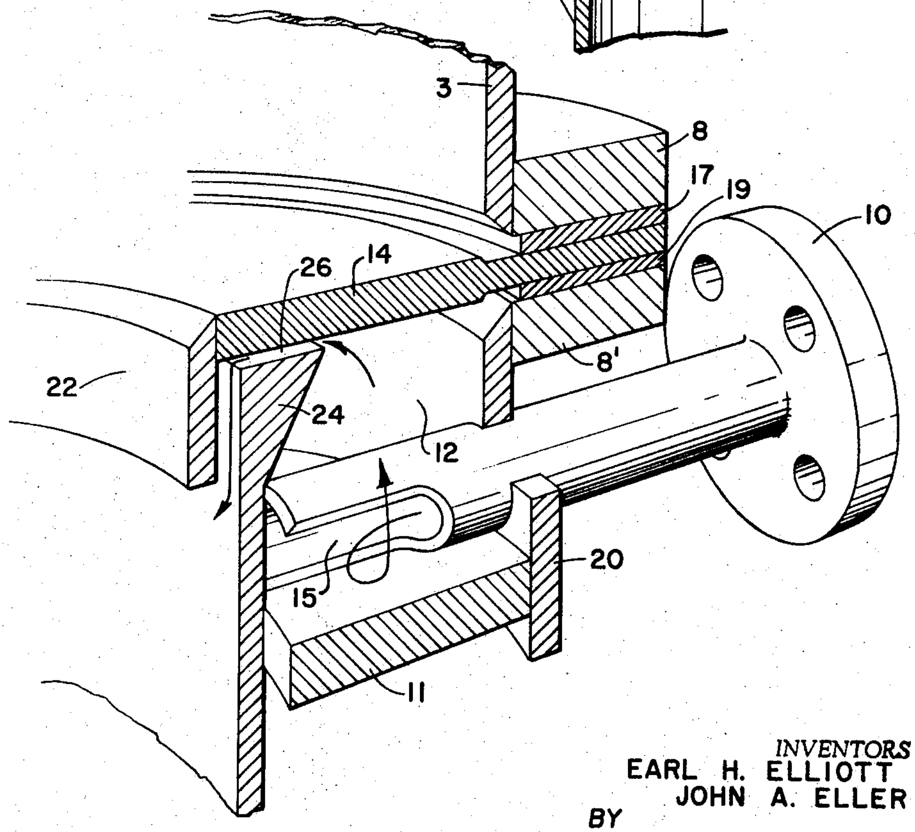
FIGURE 3 is a prospective view of the assembly as shown in FIGURE 2.

In weir assembly 4, the top portion of the cylindrical tank assembly is tapered and thickened at 24 in trough 12 (can best be seen in FIGURES 2 and 3). This relatively long flow channel (when compared to the lower housing sidewall), coupled with the adjustable height of opening 26 affords the necessary constricted space through which the viscose must flow from the weir assembly into the tank and thereby maintains a suitable pressure within the assembly to prevent flashing and foaming therein.

In operation of the device it has been found that viscose flashing and foaming, which heretofore have caused formation of skins in this area, are prevented when opening 26 is at least one-sixteenth inch wide and its length is approximately three-fourths inch long when the viscose flow rate is approximately eight gallons per minute. It is to be appreciated, however, that the size opening can often be determined by empirical methods and depends largely on the viscose rate of flow, its composition, and viscosity. What is important is the fact that the size opening must be regulated to maintain sufficient pressure within the weir assembly. The height of the opening may conveniently be adjusted by varying the thickness of gasket 19. Gasket 17 prevents air seepage to within the vessel.

Positioned in the lower cylindrical tank portion 1 are two baffle assemblies 5 and 6 and a connection for an additional assembly if its use is desired or needed. These assemblies are detachably mounted to the tank at 18 by support rods 16. Support rods 16 may be threaded to permit vertical adjustment of the assemblies within the tank.

Each of assemblies 5 and 6 is composed of three separate and distinct sections. Truncated conical section 28 of upper baffle assembly 5 serves to collect and redistribute the viscose again into a thin film along the sidewall of the tank after its flow downwardly from the weir assembly. Any viscose breaking away from the inner sidewall or spilling over the top of section 28 is collected and spread along intermediate sectional "inverted frustum of a cone" structure 29 which projects from support bar 32 between upper and lower sections 28 and 30, respectively. This section has a gradually descending surface which allows continual thin film flow of the major amount of splattered viscose which could possibly fall over the top of section 28 and the viscose which breaks away from the sidewall between 28 and 30. In addition, section 29 serves to "blade" and collect any overly thick viscose passing along the side between sections 28 and 30. Film flow along intermediate projecting section 29 is continuously and effectively collected, spread, and passed therefrom to lower section 30, and downwardly to any lower attached assemblies such as assembly 6. The term "blade" means to smooth out and acts in a manner of a circular doctor blade.

Baffle assembly 6 serves to again unify and spread the viscose passing from assembly 5 and in the same manner. The flow of viscose continues in a downward direction until coming in contact with an additional baffle assemblies which may be attached to baffle assembly 6, if desired. Should it not be necessary to include additional assemblies, the degassed viscose is then removed by conventional means (not shown). The tank is attached to a source of vacuum, preferably in the cover assembly in manner shown in U.S. Patent 2,684,728.

Sections 28, 29, 30 of baffle assemblies 5 and 6 are secured and maintained in proper position by rod-like supports 32 and 32'. Support 32' of assembly 6 has openings for rods 32 for a quick assembly/disassembly feature and any subsequent assemblies can be constructed in like manner if desired. Both primary baffle assembly 5 and secondary baffle assembly 6 are detachably mounted to the tank by support rods 16 to the inner sidewall of the tank at 18. Thus, by merely removing the bolts on the rods, the baffle assemblies may be lifted from the unit at one time for cleaning and/or repair purposes. This is permitted by the attachment of the secondary baffle assembly 6 to the primary baffle assembly 5 by connecting links 34. To gain uniform spacing from the inner sidewalls of the lower tank, the baffle assemblies may be centered by threaded bolts 36.

For reasons of clarity and simplicity, emphasis has been given specifically to the degasification of viscose. This of course is not to mean that other viscous materials such as thermoplastic matter, syrups etc. may be likewise effectively degasified using the apparatus according to the invention.

Since many widely different embodiments of this invention may be made without departing from its intended spirit and scope, it is understood that it should not be limited to any specific embodiment shown and described but only as defined in the following claims.

What is claimed is:

1. In a viscous liquid degasification apparatus consisting of a vessel having a viscous liquid inlet nozzle connecting to a distribution channel having an adjustable film-forming outlet means, the improvements comprising:

(a) a plurality of separate and distinct liquid collecting and flow directing assemblies in said apparatus located below said distribution channel, (b) each assembly composed of several liquid collecting and redistributing sections, with the first and third of said sections being upright and constructed to form a channel with the inner wall of the vessel to redistribute a uniform film of the liquid along said inner wall, (c) the second of said sections being in a form of an inverted frustum of a cone and located intermediate to the first and third sections and constructed to reduce the thickness of a viscous liquid film passing from the first and to the third sections and wherein, (d) said second section further being constructed to collect any liquid spilling over the top of a first section of the assembly.

2. Apparatus as defined in claim 1 wherein at least one of the flow collecting and flow directing assemblies has means for attachment to and spaced from the vessels cylindrical inner sidewall, with a second assembly attached thereto, and additional assemblies attached to each other.

References Cited

UNITED STATES PATENTS

| | | | |
|---|---|---|---|
| 594,783 | 11/1897 | Foster | 159—27 |
| 2,355,057 | 8/1944 | Copeland | 159—13 X |
| 2,580,646 | 1/1952 | Belden | 202—154 |
| 2,684,728 | 7/1954 | Malm | 55—190 |
| 2,971,603 | 2/1961 | Schmitz | 55—190 |
| 3,226,916 | 1/1966 | Bradford et al. | 55—193 |
| 3,273,630 | 9/1966 | Kuhnlein | 159—6 |

SAMIH N. ZAHARNA, *Primary Examiner.*

REUBEN FRIEDMAN, *Examiner.*

R. W. BURKS, *Assistant Examiner.*